United States Patent
Yang et al.

(10) Patent No.: US 11,216,037 B2
(45) Date of Patent: Jan. 4, 2022

(54) ELECTRONIC DEVICE

(71) Applicant: BEIJING XIAOMI MOBILE SOFTWARE CO., LTD., Beijing (CN)

(72) Inventors: Jieming Yang, Beijing (CN); Gaocai Han, Beijing (CN); Xuehu Zhang, Beijing (CN); Hongzhi Jin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/698,154

(22) Filed: Nov. 27, 2019

(65) Prior Publication Data
US 2020/0341517 A1 Oct. 29, 2020

(30) Foreign Application Priority Data

Apr. 26, 2019 (CN) .......................... 201910344126.3

(51) Int. Cl.
*G06F 1/16* (2006.01)
*H04M 1/02* (2006.01)

(52) U.S. Cl.
CPC ........ *G06F 1/1652* (2013.01); *H04M 1/0216* (2013.01); *H04M 1/0237* (2013.01);
(Continued)

(58) Field of Classification Search
CPC . G06F 1/1652; H04M 1/0216; H04M 1/0237; H01M 1/0264; H01M 1/0268
See application file for complete search history.

(56) References Cited

U.S. PATENT DOCUMENTS

| | | | |
|---|---|---|---|
| 6,201,868 B1* | 3/2001 | Murphy .............. | H04M 1/0237 379/433.01 |
| 10,708,395 B1* | 7/2020 | Han ..................... | H05K 5/0217 |

(Continued)

FOREIGN PATENT DOCUMENTS

| | | |
|---|---|---|
| CN | 101207985 A | 6/2008 |
| CN | 201230427 Y | 4/2009 |

(Continued)

OTHER PUBLICATIONS

Extended European Search Report issued to EP Application No. 19216878.9 dated May 8, 2020, (11p).

(Continued)

*Primary Examiner* — Christopher E Mahoney
(74) *Attorney, Agent, or Firm* — Arch & Lake LLP

(57) ABSTRACT

An electronic device includes a body and a flexible display. The body is provided with a slide rail and includes a first surface, a second surface opposite the first surface and a side surface coupling the first and second surfaces. The flexible display is disposed on the body and includes a first and a second display portion. The first display portion is mounted with a bracket, and the bracket slides relative to the slide rail to switch the flexible display between a retracted state and a slide-out state. When in the retracted state, the first display portion covers the first surface and the side surface, and the second display portion covers at least a part of the second surface; wherein when switched to the slide-out state, a free end of the first display portion is approached the side surface to expose a hidden region of the first surface.

17 Claims, 10 Drawing Sheets

(52) U.S. Cl.
CPC ....... *H04M 1/0264* (2013.01); *H04M 1/0268* (2013.01); *H04M 1/026* (2013.01)

(56) References Cited

U.S. PATENT DOCUMENTS

| | | | |
|---|---|---|---|
| 10,778,821 B1* | 9/2020 | Yang | G06F 1/1624 |
| 2011/0007458 A1* | 1/2011 | Liao | H04M 1/0237 |
| | | | 361/679.01 |
| 2011/0102989 A1* | 5/2011 | Lee | G06F 1/1624 |
| | | | 361/679.01 |
| 2014/0362513 A1* | 12/2014 | Nurmi | G06F 1/1652 |
| | | | 361/679.27 |
| 2016/0070305 A1* | 3/2016 | Kim | H04M 1/0268 |
| | | | 345/173 |
| 2016/0143131 A1 | 5/2016 | Ahn | |
| 2016/0324023 A1 | 11/2016 | Kim et al. | |
| 2017/0038798 A1* | 2/2017 | Lee | G06F 1/1616 |
| 2017/0310799 A1* | 10/2017 | Lin | G06F 1/1652 |
| 2018/0164852 A1 | 6/2018 | Lim et al. | |
| 2018/0198896 A1* | 7/2018 | Kang | G06F 1/1652 |
| 2019/0124186 A1* | 4/2019 | Zeng | H04M 1/0237 |
| 2019/0245955 A1* | 8/2019 | Lee | G06F 1/1643 |
| 2020/0117245 A1* | 4/2020 | Ou | H04M 1/0268 |
| 2020/0264660 A1* | 8/2020 | Song | G06F 1/1652 |
| 2020/0326754 A1* | 10/2020 | Kim | H04M 1/0214 |
| 2020/0329572 A1* | 10/2020 | Wittenberg | H05K 5/0017 |
| 2020/0336577 A1* | 10/2020 | Han | G06F 1/1652 |
| 2021/0034223 A1* | 2/2021 | Sun | G09G 5/14 |

FOREIGN PATENT DOCUMENTS

| | | |
|---|---|---|
| CN | 104301458 A | 1/2015 |
| CN | 208580354 U | 3/2019 |
| CN | 109618033 A | 4/2019 |
| EP | 3255867 A1 | 12/2017 |

OTHER PUBLICATIONS

European Patent Office, Office Action Issued in Application No. 19216878.9, dated Oct. 22, 2021, Germany, (7p).

* cited by examiner

ELECTRONIC DEVICE

CROSS-REFERENCE TO RELATED APPLICATION

This application claims priority to Chinese Patent Application No. 201910344126.3 entitled "ELECTRONIC DEVICE" filed with Chinese Patent Office on Apr. 26, 2019, the entire content of which is incorporated herein by reference.

TECHNICAL FIELD

The present disclosure relates to the field of terminal technology, and in particular to an electronic device.

BACKGROUND

At present, a display screen of an electronic device is only disposed on one surface of the electronic device. Further, it is also desired to dispose other components such as a camera, an ambient light sensor and a receiver in the surface, which occupies an assembly space of the display screen. In this case, it is not helpful to increase a screen-to-body ratio.

SUMMARY

Embodiments of the present disclosure provide an electronic device.

The electronic device according to embodiments of the present disclosure includes a body and a flexible display. The body is provided with a slide rail and includes a first surface, a second surface disposed opposite to the first surface, and a side surface coupling the first surface and the second surface. The flexible display is disposed on the body and includes a first display portion where the first display portion is mounted with a bracket, and the bracket slides relative to the slide rail to switch the flexible display between a retracted state and a slide-out state, and a second display portion integrated with the first display portion. When the flexible display is in the retracted state, the first display portion covers the first surface and the side surface, and the second display portion covers at least a part of the second surface. When the flexible display is switched from the retracted state to the slide-out state, the first display portion slides along a direction in which a free end of the first display portion is approached the side surface to expose a hidden region of the first surface.

It is to be understood that the above general descriptions and the below-detailed descriptions are merely examples and are not intended to limit the present disclosure.

BRIEF DESCRIPTION OF THE DRAWINGS

The accompanying drawings, which are incorporated in and constitute a part of the present specification, illustrate embodiments consistent with the present disclosure and serve to explain the principles of the present disclosure together with the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context. The term "coupled" may be understood to mean "directly connected" or "indirectly connected."

As shown in FIGS. 1-6, embodiments of the present disclosure provide an electronic device with a flexible screen. In these embodiments, the electronic device specifically may be a mobile phone, and may also be a tablet computer or another intelligent mobile device having a display function.

Figure 1:
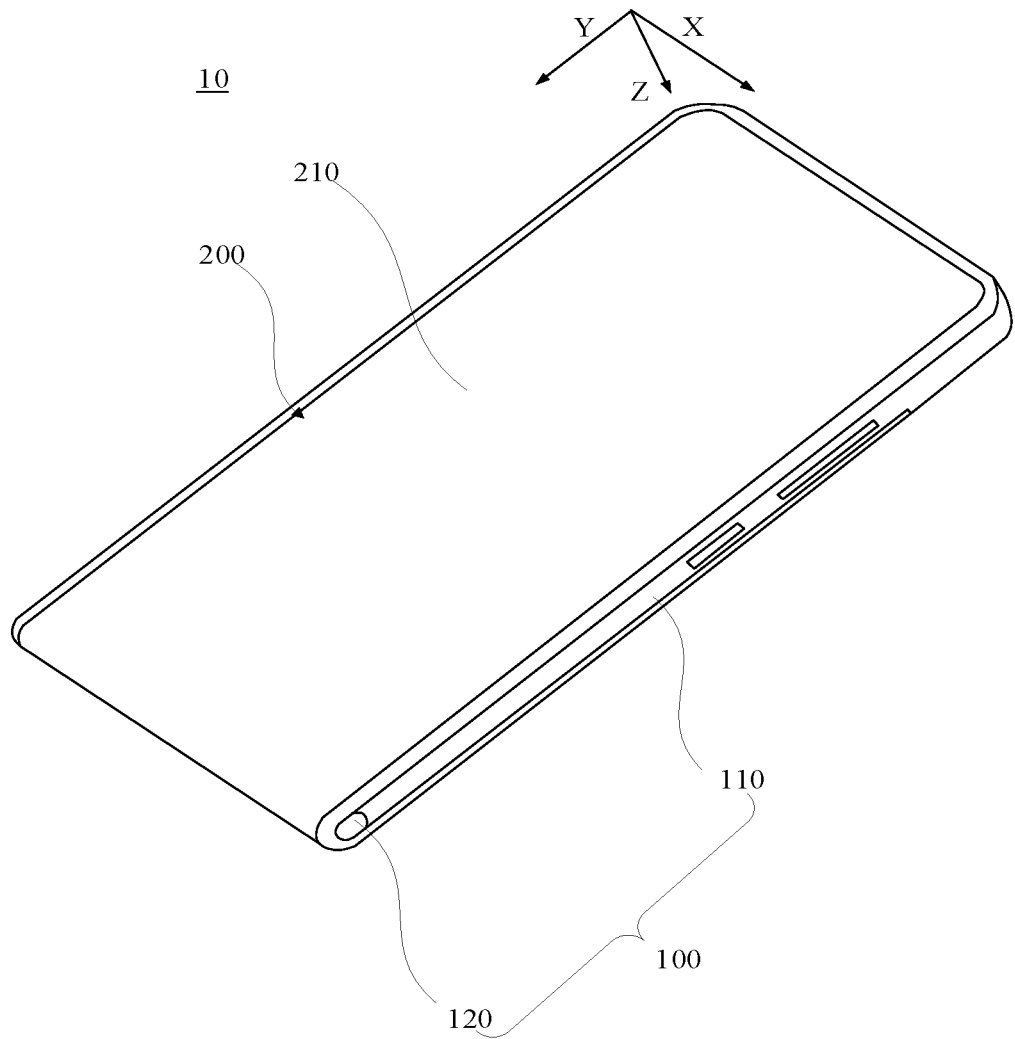
FIG. 1 is a perspective schematic view of a structure of an electronic device, according to an example of the present disclosure.
Figure 2:
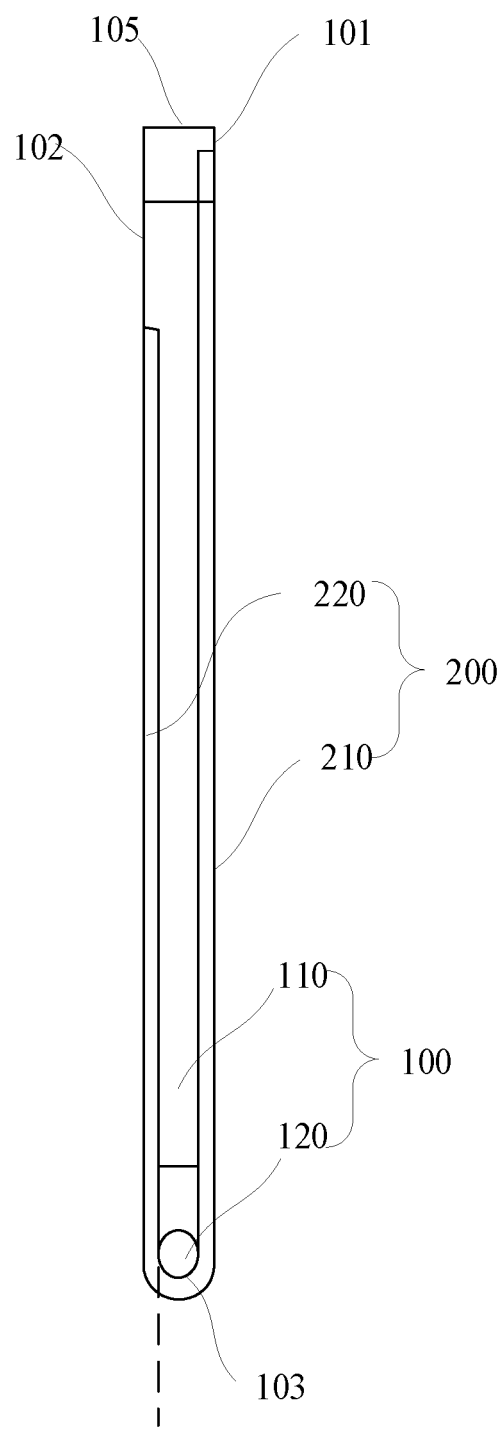
FIG. 2 is a side schematic view of a structure of an electronic device, according to an example of the present disclosure.

FIG. 1 is a perspective schematic view of a structure of an electronic device, according to an example of the present disclosure. The electronic device includes a body 100 and a flexible display 200. FIG. 2 is a side schematic view of a structure of an electronic device. The body 100 includes a first surface 101, a second surface 102, and a side surface 103. The first surface 101 and the second surface 102 are oppositely disposed, and one end of the first surface 101 includes a hidden region 104. The side surface 103 is adjacent to and connects the first surface 101 and the second surface 102. Further, the side surface 103 is adjacent to an end of the first surface 101 that is opposite to the end where the hidden region is located. A slide rail 130 is disposed on the body 100.

The flexible display 200 is disposed on the body 100 and includes a first display portion 210 and a second display portion 220 which are integrated into one piece. As shown in FIG. 2, a dashed line is taken as a boundary. For example, the dashed line is tangent to a movable member 120 included in the body 100, close to the second surface 102, and extends along a direction parallel to the second surface 102. In this state, a part on the right of the dashed line of the flexible display 200 is the first display portion 210, and a part left of the dashed line of the flexible display 200 is the second display portion 220. The first display portion 210 is mounted with a bracket 211 and may bring along the bracket 211 to move. Certainly, the bracket 211 may also bring along the first display portion 210 to move. The bracket 211 may slide relative to the slide rail 130, or the bracket 211 and the slide rail 130 may slide relative to each other, so as to switch the flexible display 200 between a retracted state 10 and a slide-out state 20. The bracket 211 and the slide rail 130 may be directly connected or connected through other components, so as to guide the flexible display 200 to slide, which enables the flexible display 200 to slide more stably.

Figure 3:
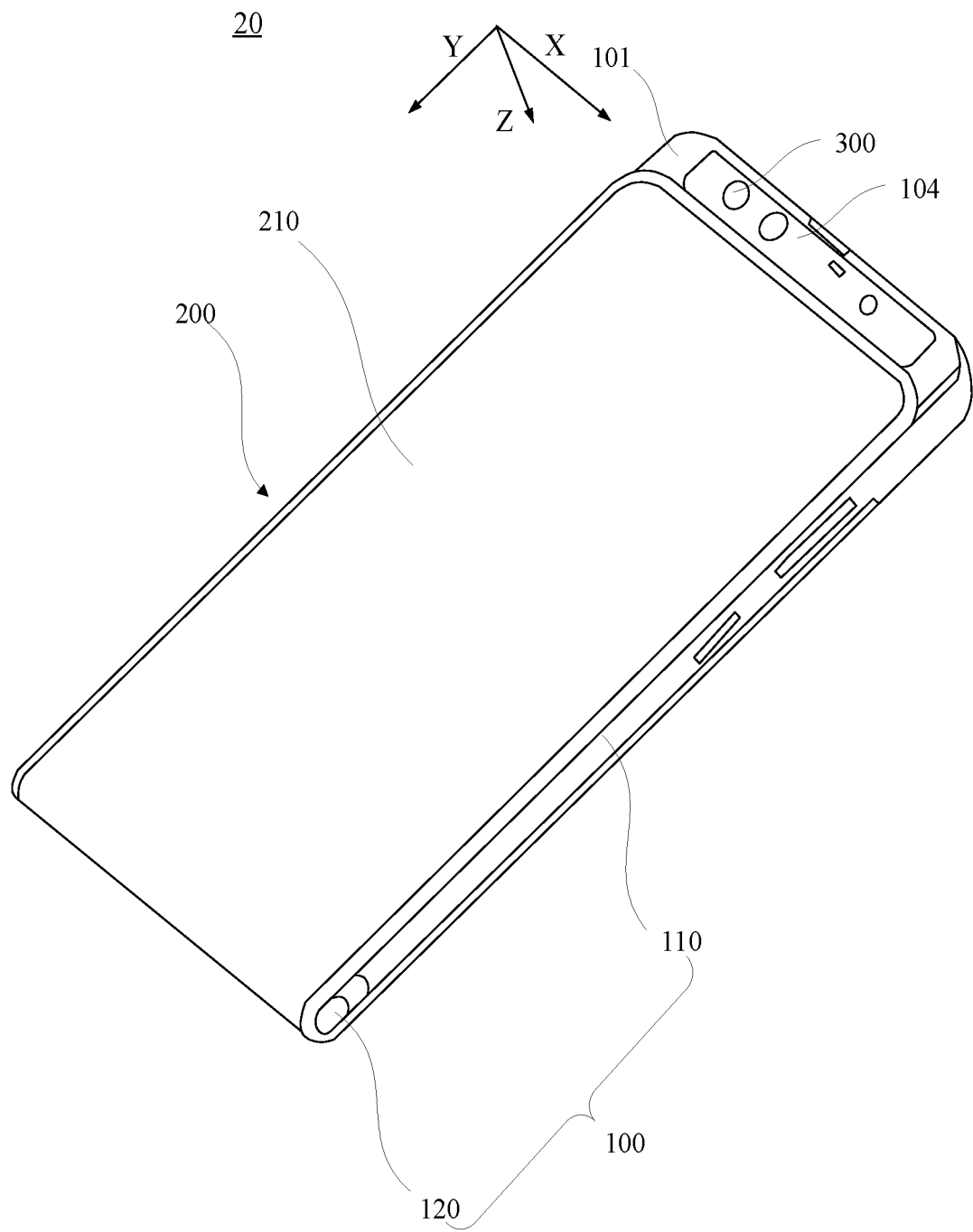
FIG. 3 is another perspective schematic view of a structure of an electronic device, according to an example of the present disclosure.
Figure 4:
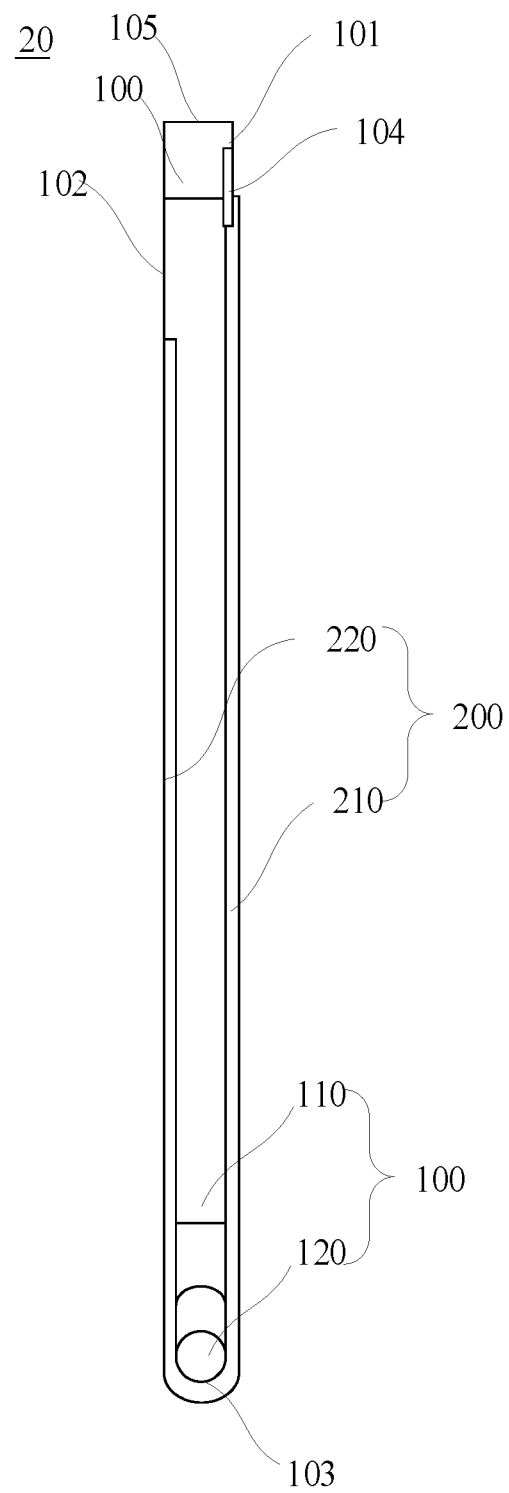
FIG. 4 is another side schematic view of a structure of an electronic device, according to an example of the present disclosure.

As shown in FIG. 1 and FIG. 2, the flexible display 200 is in the retracted state 10. As shown in FIG. 3 and FIG. 4, the flexible display 200 is in the slide-out state 20. When the flexible display 200 is in the retracted state 10, the first display portion 210 covers the first surface 101 and the side surface 103, and the second display portion 220 covers at least a part of the second surface 102. When the flexible display 200 is switched from the retracted state 10 to the slide-out state 20, the first display portion 210 slides along a direction in which a free end of the first display portion 210 is approached the side surface 103, so as to expose the hidden region 104 of the first surface 101.

The hidden region 104 is provided with a camera 300. Similarly, other functional components, such as an ambient light sensor, a distance sensor, a dot projector, and a receiver, may also be disposed in the hidden region 104. One or more of the above functional components may be selected according to an actual requirement.

In one or more embodiments, the receiver is disposed at a connection location of the first surface 101 and an upper surface, i.e., a fixed surface 105, of the body 100. When the flexible display 200 of the electronic device is in the retracted state 10, the flexible display 200 does not affect the use of the receiver, and the screen-to-body ratio of the first surface 101 is increased at the same time.

Figure 7:
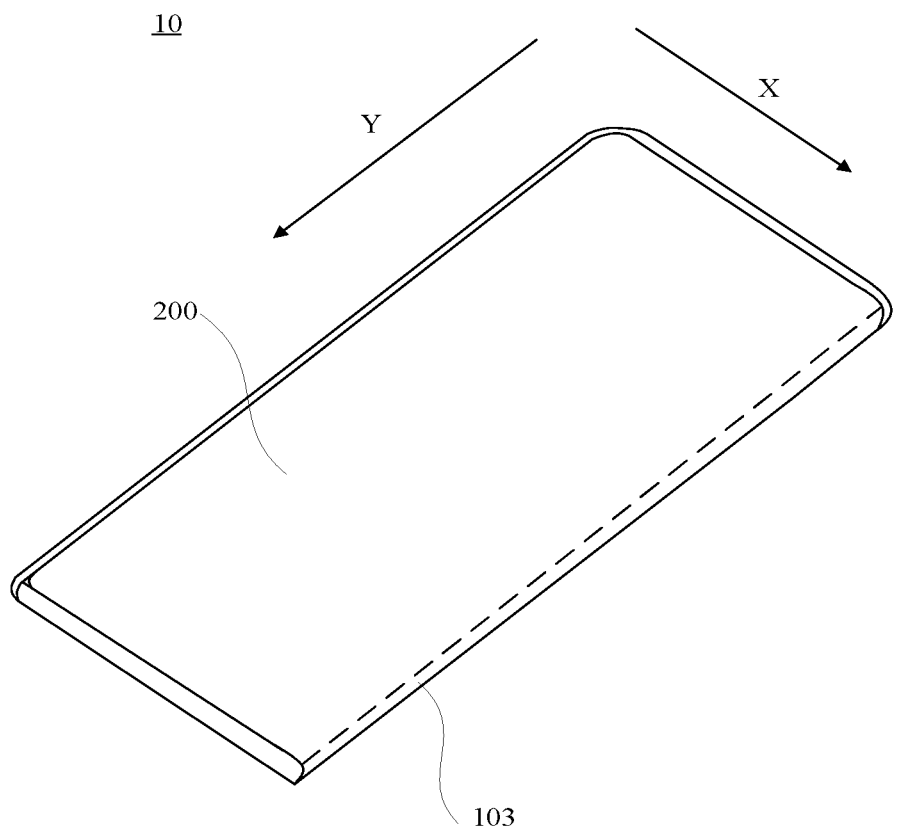
FIG. 7 is a perspective schematic view of a structure of an electronic device, according to an example of the present disclosure.
Figure 8:
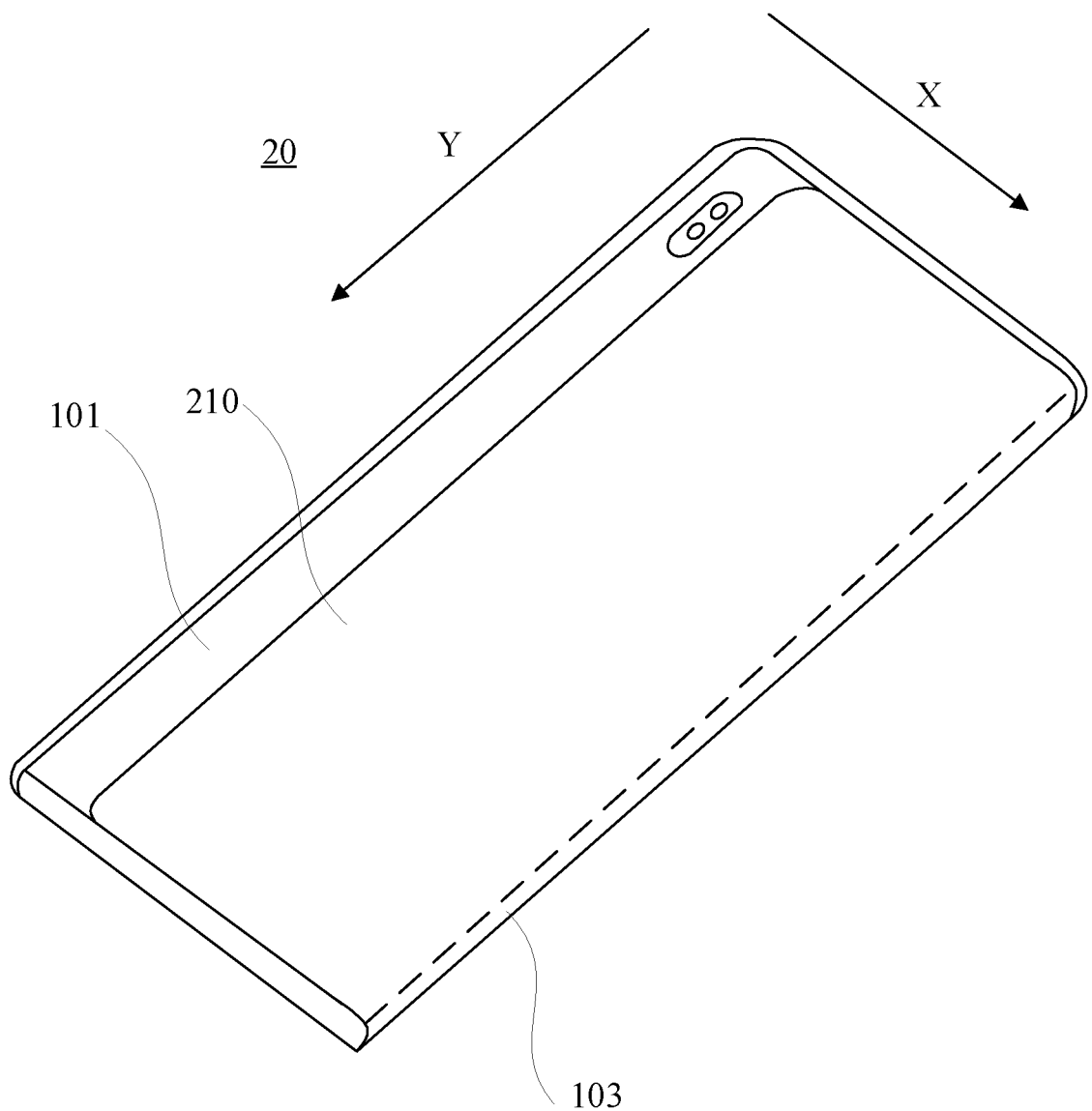
FIG. 8 is another perspective schematic view of a structure of an electronic device, according to an example of the present disclosure.

It is to be noted that, in one or more embodiments, the first surface 101 is a front surface of the body 100, the second surface 102 is a back surface of the body 100, the side surface 103 is a lower surface of the body 100, and the upper surface described above refers to a surface of the body 100 which is disposed opposite to the side surface 103. At this time, a slide direction of the flexible display 200 is a length direction Y of the electronic device. When the flexible display 200 is switched from the retracted state 10 to the slide-out state 20, an upper part of the first surface 101 is exposed. Certainly, in other embodiments, the side surface 103 may also be the upper surface of the body 100. When the flexible display 200 is switched from the retracted state 10 to the slide-out state 20, a lower part of the first surface 101 is exposed. Optionally, as shown FIG. 7 and FIG. 8, the side surface 103 may also be one of the surfaces on both left and right-side portions of the body 100. At this time, the slide direction of the flexible display 200 is a width direction X of the electronic device. When the flexible display 200 is switched from the retracted state 10 to the slide-out state 20, at least a part of the left side portion or right-side portion of the first surface 101 is exposed.

With the above configuration, three surfaces of the electronic device are all covered with the flexible display 200, and the hidden region 104 of the first surface 101, which is configured to mount the functional components may be exposed by switching the states of the flexible display 200. In this case, the screen-to-body ratio of the electronic device is increased maximally, while the space occupied by the functional components is reduced.

As shown in FIGS. 1-5, the body 100 includes a main part 110 and a movable member 120 separably coupled with the main part 110. Surfaces of the main part 110 form the first surface 101 and the second surface 102, and a surface of the movable member 120 that is away from the main part 110 forms the side surface 103.

When the flexible display 200 is in the retracted state 10, the movable member 120 is abutted against the main part 110, and the first display portion 210 covers the first surface 101 and the side surface 103. When the flexible display 200 is in the slide-out state 20, the movable member 120 is separated from the main part 110, and at least a part of the first display portion 210 still covers a part of the first surface 101 of the main part 110 which is away from the hidden region 104, as well as the side surface 103 of the movable member 120.

When a user desires to use the functional component in the hidden region 104, the state of the flexible display 200 may be changed, so that the flexible display 200 is switched from the retracted state 10 to the slide-out state 20 to expose the hidden region 104. At this time, size of the body 100 in the length direction Y is increased, at least a part of the first display portion 210 is moved downwardly to compensate for the increased length of the body 100, and thus the hidden region 104 is exposed. Through the above configuration, the size of the first display portion 210 on the first surface 101 will not be subjected to excessive change resulted from the switching of the state of the electronic device. In this case, the functional components are ensured to be exposed, and meanwhile, a larger screen-to-body ratio of the first surface 101 is ensured.

Figure 5:
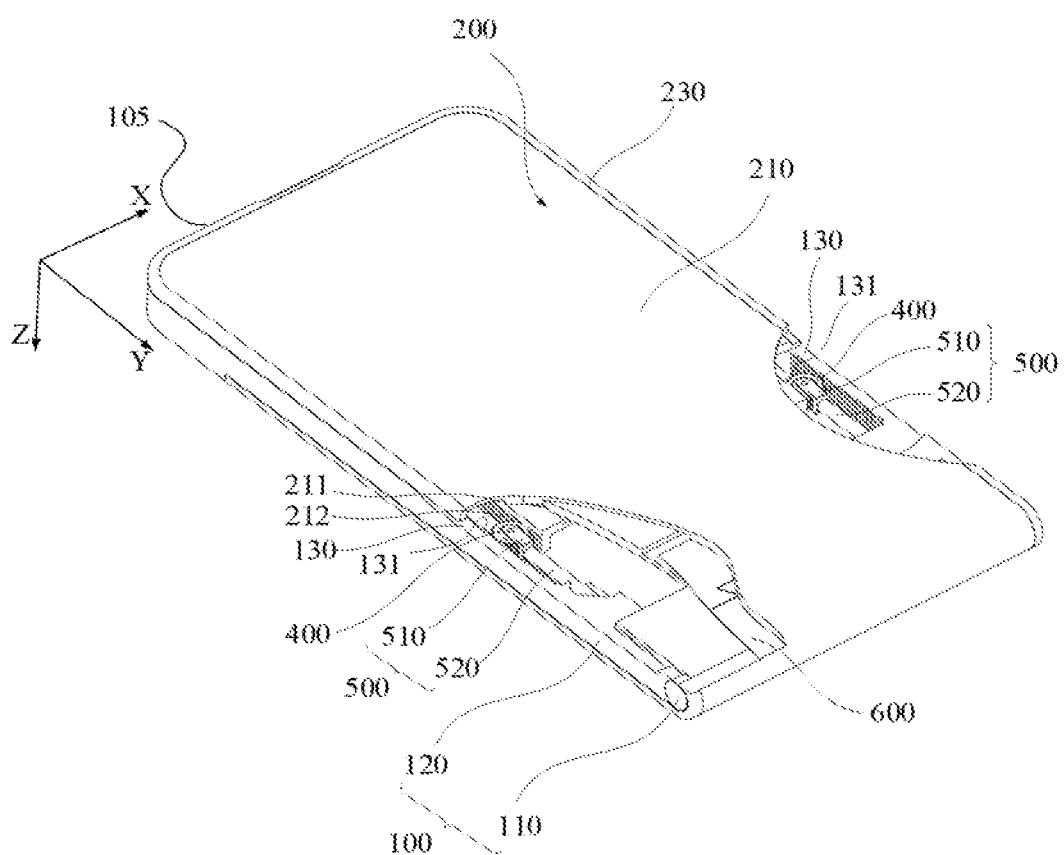
FIG. 5 is a schematic view of a structure of an electronic device with an inside structure thereof shown, according to an example of the present disclosure.

As shown in FIG. 5, in one or more embodiments, the slide rail 130 is disposed on the main part 110, and the bracket 211 is disposed at a part of the first display portion 210, which is away from the side surface 103 to support and protect the first display portion 210. A first rack 131 is disposed on the slide rail 130, and a second rack 212 is disposed at a location of the bracket 211, which faces toward the first rack 131. An engaging gear 400 is disposed between the first rack 131 and the second rack 212, and the gear 400 is coupled with the movable member 120. When the first display portion 210 slides relative to the first surface 101, the bracket 211 may be moved along the length direction Y, and slide relative to the slide rail 130. At this time, the gear 400 engaged with both the first rack 131 and the second rack 212 is moved and rotated along the slide direction of the bracket 211.

In one or more embodiments, the first rack 131, the gear 400 and the second rack 212 are sequentially arranged along the width direction X of the electronic device. Through the above arrangement, a thickness of the electronic device will not be increased while the first rack 131, the gear 400 and the second rack 212 achieve linkage of the movable member 120 and the first display portion 210, which is conducive to the design of a light and thin electronic device. Certainly, in other embodiments, the first rack 131, the gear 400, and the second rack 212 may also be sequentially arranged along a thickness direction Z or another direction of the electronic device. Further, the slide rail 130 and the first rack 131 are disposed at a side edge portion of the main part 110, thereby avoiding occupying a central space in the electronic device. Certainly, in other embodiments, the slide rail 130 and the first rack 131 may also be disposed on the first surface 101 of the body 100.

The flexible display 200 further includes a screen shell 230. The screen shell 230 is configured to support the first display portion 210 and the second display portion 220. In one or more embodiments, the screen shell 230 is fixedly disposed on the surfaces of both the first display portion 210 and the second display portion 220 which face toward the interior of the electronic device, and envelops outer edges of both the first display portion 210 and the second display portion 220, so as to support and protect the first display portion 210 and the second display portion 220. At least a part of the screen shell 230 forms the above bracket 211. Through the above arrangement, the number of components of the electronic device is reduced, and a mounting process is simplified, thereby facilitating the design of the light and thin electronic device.

The electronic device further includes a connection assembly 500, and the gear 400 is coupled with the movable member 120 through the connection assembly 500. The connection assembly 500 includes a connection portion 510 and a fixing portion 520. The connection portion 510 is rotatably coupled to the gear 400, and one end of the fixing portion 520 is fixedly coupled to the connection portion 510, and the other end of the fixing portion 520 is fixedly coupled to the movable member 120. Therefore, when the gear 400 is moved along with the bracket 211, the movable member 120 is moved close to or away from the main part 110 by only applying an acting force, which is toward or away from the main part 110, to the movable member 120, so as to lengthen or shorten the electronic device. With the above arrangement, the gear 400 can bring along the movable member 120 to move close to or away from the main part 110. In one or more embodiments, there are two first racks 131 and two-second racks 212. Correspondingly, there are two gears 400 and two connection assemblies 500, and the gears 400 and the connection assemblies 500 are distributed at two sides of both the body 100 and the first display portion 210. Certainly, in other embodiments, the number of the first racks 131, the second racks 212, the gears 400 and the connection assemblies 500 may also be one, three or more, respectively. Further, in other embodiments, slide between the slide rail 130 and the bracket 211 may also be realized in other manners. For example, the slide rail 130 is directly and slidably disposed in a groove of the bracket 211, so as to realize the slide therebetween.

When the flexible display 200 is switched from the retracted state 10 to the slide-out state 20, the screen shell 230 brings along the first display portion 210 to slide along the direction in which the free end of the first display portion 210 is approached the side surface 103. At this time, the second rack 212 moves together with the screen shell 230 to get close to the side surface 103 along the length direction Y of the electronic device, and the first rack 131 fixed to the body is stationary. The second rack 212 brings along the gear 400 engaged between the first rack 131 and the second rack 212 to move, so as to enable the gear to roll downwardly relative to the first rack 131, that is, roll toward the side surface 103. Further, since the gear 400 is coupled to the movable member 120 through the connection assembly 500, a moving speed of the gear 400 along the length direction Y of the electronic device is half of a moving speed of the free end of the first display portion 210. At the same time, the gear 400 brings along the movable member 120 to move away from the main part 110 through the connection assembly 500, and thus the length of the body 100 is increased.

To reduce abrasion between the first display portion 210 and the movable member 120, a flexible backing layer 600 may be added and provided at a contact area of the first display portion 210 and the movable member 120. The flexible backing layer 600 may be made of rubber and other materials.

In the above structure, when the flexible display 200 is switched from the retracted state 10 to the slide-out state 20, that is, when the free end of the first display portion 210 is moved downwardly, the movable member 120 is moved away from the main part 110, and a ratio of a moving distance of the movable member 120 to a moving distance of the free end of the first display portion 210 is 1 to 2, that is, a moving speed of the movable member 120 is one half of the moving speed of the free end of the first display portion 210. At this time, the length of the body 100 is increased. A part of the first display portion 210, which is away from the second display portion 220 is moved downwardly to compensate for the increased length of the body 100. At the same time, the hidden region 104 of the first surface 101 is exposed. A part of the first display portion 210, which is close to the second display portion 220 is moved upwardly and is extended onto the second surface 102, and this part may compensate for the increased length of the body 100. This part may only be at least one part of a portion of the first display portion 210 which covers the side surface 103 in the retracted state 10, and may also include at least one part of a portion of the first display portion 210 which covers the first surface 101 in the retracted state 10 at the same time. As for this, the specific adjustment may be made according to the moving distance of the flexible display 200, which is not limited herein. It is well known to those skilled in the art that through the above arrangement, the moving speed of the movable member 120 is coordinated with a sliding speed of the first display portion 210 so that the first display portion 210 and the movable member 120 always remain attached or tightly close to each other. Further, the first display portion 210 and the second display portion 220 will not be subjected to deformation such as creasing or stretching resulted from the length change of the body 100.

Certainly, in other embodiments, the coordination of the moving speed of the movable member 120 and the sliding speed of the first display portion 210 may also be realized through another structure.

The movable member 120 is of a cylindrical shape, and a surface of the main part 110 that faces the movable member 120 is recessed inwardly to form an arc surface fitting the movable member 120. Through the above arrangement, the movable member 120 and the main part 110 are smoothly coupled, which avoids the appearance of a stress concentration location on the flexible display 200, covering both the movable member 120 and the main part 110, and enhances a service life of the flexible display 200.

Further, when the flexible display 200 is switched from the retracted state 10 to the slide-out state 20, the second display portion 220 and the second surface 102 remain relatively stationary. Through the above arrangement, the movement of the second display portion 220 is reduced, so as to reduce the abrasion of the second display portion 220 and increase the service life of the second display portion 220. At the same time, functional components may also be disposed at an upper part of the second surface 102. The second display portion 220 remains stationary, so as to avoid blocking the functional components at the upper part of the second surface 102 while ensuring the maximum screen-to-body ratio. In one or more embodiments, the functional components disposed on the second surface 102 include a rear camera, a light-emitting circuit, and the like.

Figure 9:
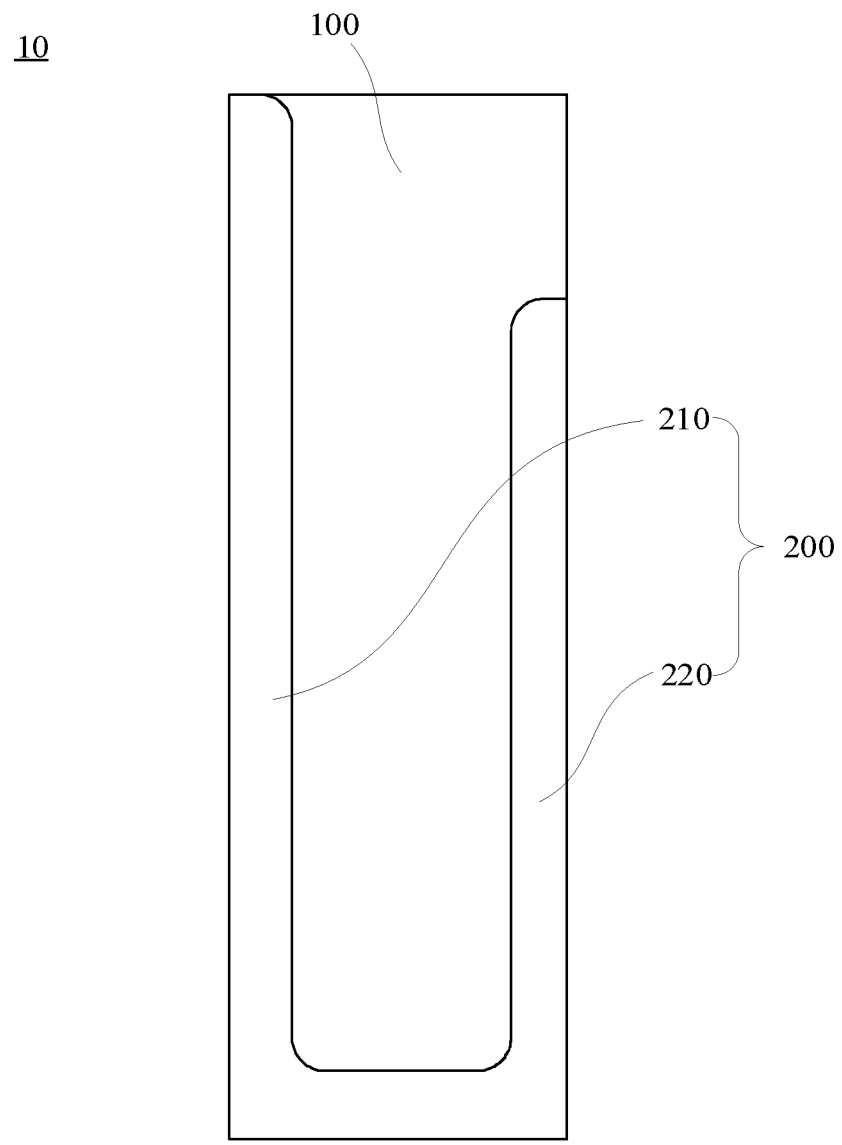
FIG. 9 is a schematic view of a structure of an electronic device, according to an example of the present disclosure.
Figure 10:
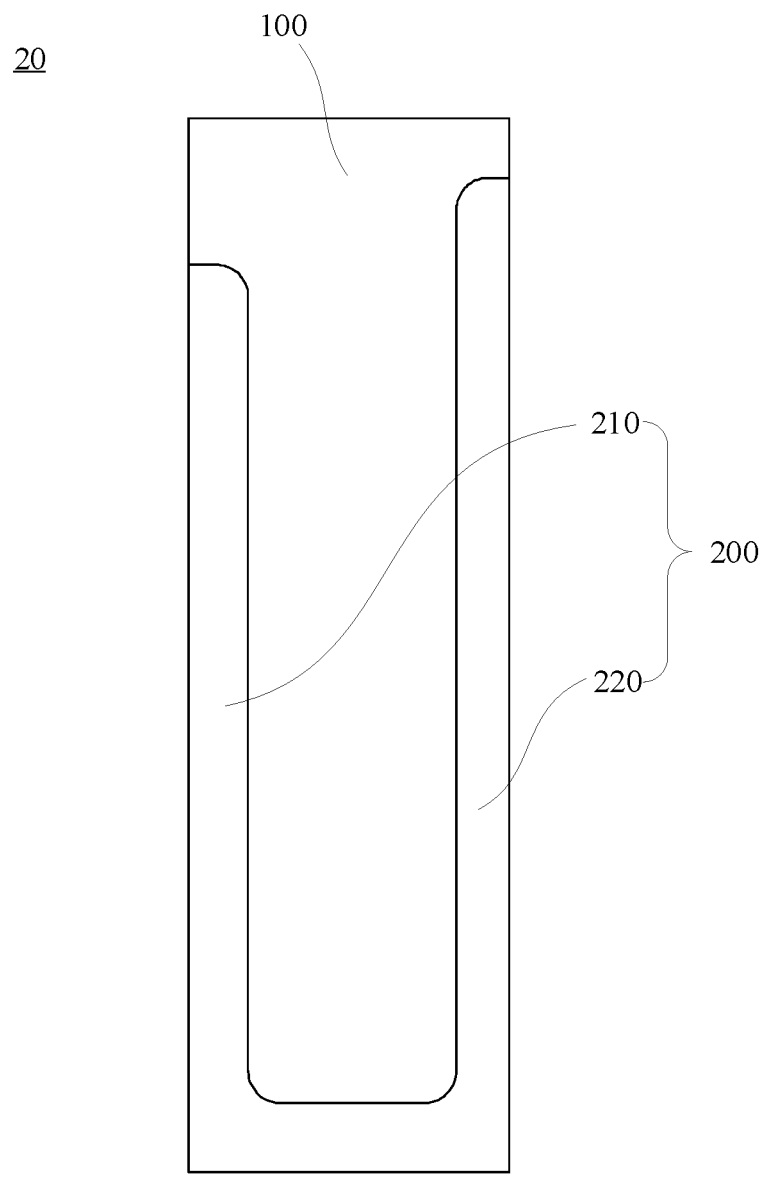
FIG. 10 is another schematic view of a structure of an electronic device, according to an example of the present disclosure.

Certainly, in other embodiments, when the flexible display 200 is switched between the retracted state 10 and the slide-out state 20, the second display portion 220 may also be moved relative to the second surface 102. As shown in FIG. 9 and FIG. 10, when the flexible display 200 is switched from the retracted state 10 to the slide-out state 20, a part of the first display portion 210 that is close to the second display portion 220 is moved upwardly and extended onto the second surface 102, and the second display portion 220 is moved along with the movement of the first display portion 210, that is, the second display portion 220 is moved along a direction in which the free end of the second display portion 220 is moved away from the side surface 103. Through the above arrangement, when the hidden region 104 of the first surface 101 is exposed, an area of a portion of the second surface 102 which is covered with the flexible display 200 is increased, that is, the second surface 102 is covered with the second display portion 220 and at least a part of the first display portion 210. Therefore, the screen-to-body ratio of the second surface 102 is increased, and the structure is simplified. Since the second display portion 220 moves along with the first display portion 210, the moving distance of the first display portion 210 is equal to the moving distance of the second display portion 220. Through the above arrangement, the flexible display is always attached or positioned tightly close to the surface of the body 100. Meanwhile, the first display portion 210 can move to the second surface 102 of the body 100 maximally to increase the screen-to-body ratio of the second surface 102.

In addition, the electronic device further includes a driver (not shown) and a controller (not shown). The driver may drive the flexible display 200 to switch between the retracted state 10 and the slide-out state 20. In one or more embodiments, the driver may drive the gear 400 to enable the first display portion 210 to slide relative to the body 100, and may also drive the bracket 211 fixed to the first display portion 210 to slide so as to bring along the first display portion 210 to move, thereby causing the flexible display 200 to switch between two states. The controller is electrically coupled with the driver to control the movement of the driver.

The electronic device may perform touch detection and push force detection, and the like. The controller detects operations such as a user's touch and push on the flexible display to determine whether to control the driver to move, so as to assist the user in completing state switching of the flexible display 200. Optionally, the electronic device may also detect a click of a functional button by a user on a screen, such as a self-photographing or unlocking button, and thus the controller controls the driver to move upon detection of a click, so as to expose the functional components in the hidden region 104. Optionally, the electronic device may also detect a control instruction sent by a user, for example, voice contents related to self-photographing or unlocking, or the like, and thus the controller controls the driver to move upon detection of a control instruction, so as to expose the functional components in the hidden region 104.

Through the above arrangement, the electronic device may realize automatic control for the flexible display 200. Certainly, the electronic device may also switch states of the flexible display 200 only in a manual control manner. Optionally, the electronic device may also switch states of the flexible display 200 in a manner of a combination of manual control and electric control, which is not limited herein.

Further, the bracket 211 may be actuated by a magnetic force between the bracket 211 and the first surface 101, so as to switch the flexible display 200 from the retracted state 10 to the slide-out state 20, or from the slide-out state 20 to the retracted state 10.

Figure 6:
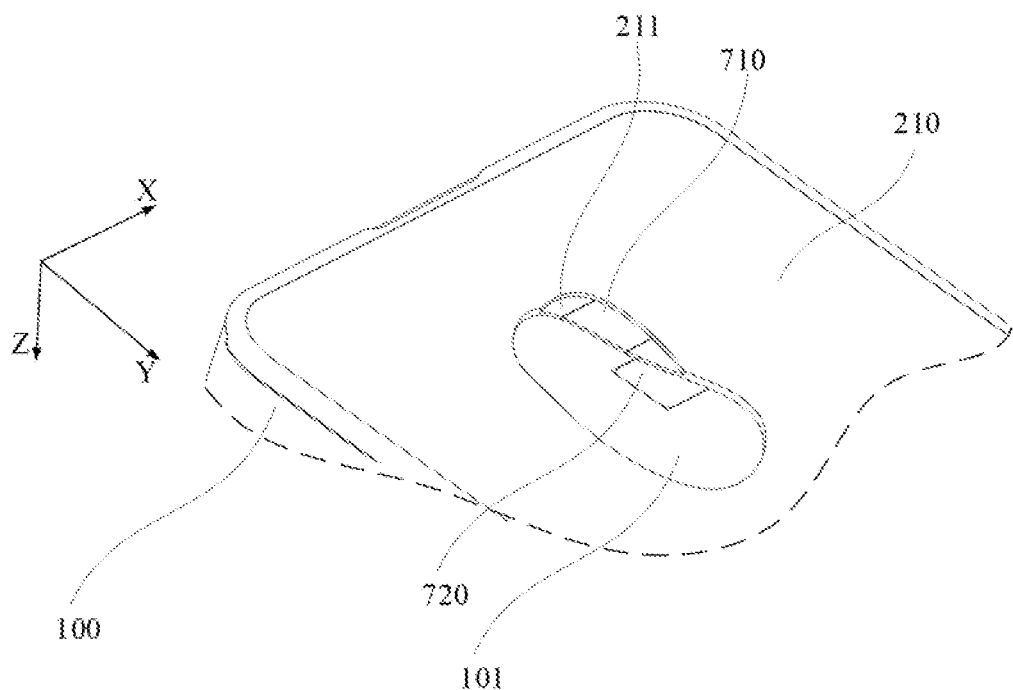
FIG. 6 is a schematic view of a partial structure of an electronic device, according to an example of the present disclosure.

Specifically, as shown in FIG. 6, a first magnet 710 is disposed on the bracket 211 fixed to the first display portion 210, and the first magnet 710 moves along with the bracket 211. A second magnet 720 is disposed on the body 100. The first magnet 710 and the second magnet 720 have the same magnetism. For example, the first magnet 710 and the second magnet 720 are magnets each of which has a single magnetic pole. Optionally, the first magnet 710 and the second magnet 720 may also be magnets, each of which has a south pole and a north pole. In the thickness direction Z of the electronic device, the south pole of the first magnet 710 faces toward the south pole of the second magnet 720, and the north pole of the first magnet 710 faces toward the north pole of the second magnet 720. That is, the first magnet 710 is disposed above the second magnet 720 in the direction Z of the electronic device. Optionally, the south pole of the first magnet 710 is farther from the second magnet 720 in comparison with the north pole of the first magnet 710, and the south pole of the second magnet 720 is farther from the first magnet 710 in comparison with the north pole of the second magnet 720. Optionally, the north pole of the first magnet 710 is farther from the second magnet 720 in comparison with the south pole of the first magnet 710, and the north pole of the second magnet 720 is farther from the first magnet 710 in comparison with the south pole of the second magnet 720. In this case, a repulsive force in the length direction Y always exists between the body 100 and the first display portion 210. When the flexible display 200 is switched between the retracted state 10 and the slide-out state 20, the first magnet 710 and the second magnet 720 may be approached to each other under an external force (for example, an acting force applied by the user to the first display portion 210, or an acting force applied by the driver to the first display portion 210), and may be moved away from each other under the magnetic force. Through the above arrangement, the magnets may assist a user in switching the state of the flexible display through the action of the magnetic force. Meanwhile, when the flexible display 200 is not subjected to the external force, the flexible display 200 may be assisted to remain in the current state (the retracted state 10 or the slide-out state 20) through the repulsive force between the magnets.

In one or more embodiments, the second magnet 720 is embedded into the first surface 101 of the body 100 and exposed, so that a larger repulsive force is generated between the first magnet 710 and the second magnet 720. Certainly, in another embodiment, the second magnet 720 may be enveloped by the first surface 101 of the body 100, or fixedly disposed in an internal space of the main part 110 of the body 100.

The body 100 further includes a fixed surface 105 disposed opposite to the side surface 103, and the fixed surface is adjacent to and connects the first surface 101 and the second surface 102. A value of a distance between the second magnet 720 and the fixed surface 105 is always a first value. When the flexible display 200 is in the retracted state 10, a value of a distance between the first magnet 710 and the fixed surface 105 is a second value. When the flexible display 200 is in the slide-out state 20, a value of a distance between the first magnet 710 and the fixed surface 105 is a third value. A ratio of a sum of the second value and the third value to the first value is approximately 2.

In other words, when the flexible display 200 is located at an intermediate position between the retracted state 10 and the slide-out state 20, the first magnet 710 on the bracket 211 directly faces the second magnet 720 on the body 100. At this time, the repulsive force between the first magnet and the second magnet reaches a maximum value. When the first display portion 210 slides along the direction in which the free end of the first display portion 210 is approached the side surface 103 and passes the intermediate position, the first display portion 210 can rapidly move to the slide-out state 20 under the action of the repulsive force between the first magnet 710 and the second magnet 720. Optionally, when the first display portion 210 slides along the direction in which the free end of the first display portion 210 is moved away from the side surface 103 and passes the intermediate position, the first display portion 210 can rapidly move to the retracted state 10 under the action of the repulsive force between the first magnet 710 and the second magnet 720.

For example, when the flexible display 200 is in the retracted state 10, the distance between the first magnet 710 and the fixed surface 105 is two centimeters. When the flexible display 200 is switched from the retracted state 10 to the slide-out state 20, the free end of the first display portion 210 may move two centimeters along the length direction Y of the electronic device, the first magnet 710 moves along with the first display portion, and the second magnet 720 is stationary relative to the main part 110. At this time, the distance between the first magnet 710 and the fixed surface 105 is four centimeters. In this case, the second magnet 720 is always located at a location of the body that is three centimeters from the fixed surface 105. As a result, when the flexible display 200 is at the intermediate position between the retracted state 10 and the slide-out state 20, the first magnet 710 directly faces the second magnet 720.

Through the above arrangement, when a user manually pushes the flexible display 200, once the first display portion 210 passes the above intermediate position, the first display portion 210 may rapidly move to be in place under the action of the magnetic force, thereby enhancing user's experiences.

Certainly, in another embodiment, the first magnet 710 and the second magnet 720 may also be electromagnets, each of which has changeable magnetic poles, and the first magnet 710 and the second magnet 720 may be used as at least a part of the driver. The user may change the magnetic poles of the first magnet 710 and the second magnet 720 so that an attractive force or a repulsive force is generated between the first magnet 710 and the second magnet 720 in different cases, so as to push the first display portion 210 to move. In this way, the flexible display 200 is switched between the retracted state 10 and the slide-out state 20.

The foregoing disclosure is merely illustrative of embodiments of the present disclosure, and shall not be intended to limit the present disclosure in any form. Although the embodiments of the present disclosure are described above, these descriptions are not intended to limit the present disclosure. Any person skilled in the art may make some variations or modifications as equivalent embodiments with equivalent changes based on the technical contents described above without departing from the scope of the technical solution of the present disclosure. All simple variations, equivalent changes, and modifications made to the above embodiments in accordance with the technical spirit of the present disclosure without departing from the contents of the technical solution of the present disclosure shall all fall into the scope of the technical solution of the present disclosure.

What is claimed is:

1. An electronic device, comprising:
   a body, comprising:
      a main part, provided with a slide rail and surfaces of which form:
      a first surface of the body comprising a hidden region at one end thereof that is provided with at least one functional component of the electronic device;
      a second surface of the body disposed opposite to the first surface;
      a flexible display disposed on the body, wherein the flexible display comprises:
      a first display portion, wherein the first display portion is mounted with a bracket, and the bracket slides relative to the slide rail to switch the flexible display between a retracted state and a slide-out state;
      a second display portion integrated with the first display portion, and
      a movable member separately coupled with the main part, wherein a surface of the movable member that is away from the main part forms a side surface of the body coupling the first surface and the second surface when the flexible display is in the retracted state;
      wherein when the flexible display is in the retracted state, the first display portion covers the first surface and the side surface, and the second display portion covers at least a part of the second surface; wherein when the flexible display is switched from the retracted state to the slide-out state, the first display portion slides along a direction in which a free end of the first display portion approaches the side surface to expose the at least one functional component in the hidden region, wherein the at least one functional component comprises a receiver, the receiver is disposed at a connection location of the first surface of the body and a fixed surface, and the fixed surface is disposed opposite to the side surface, and
      wherein when the flexible display is in the retracted state, the movable member is abutted against the main part; and when the flexible display is in the slide-out state, the movable member is separated from the main part.

2. The electronic device, according to claim 1, wherein when the flexible display is switched from the retracted state to the slide-out state, the second display portion and the second surface remain stationary.

3. The electronic device, according to claim 1, wherein a moving speed of the movable member correlates with a sliding speed of the first display portion so that the first display portion remains attached to the movable member.

4. The electronic device, according to claim 1, wherein a first rack is disposed on the slide rail, a second rack is disposed at a location of the bracket that faces toward the first rack, an engaging gear is disposed between the first rack and the second rack, and the gear is coupled with the movable member.

5. The electronic device, according to claim 4, wherein the first rack, the gear, and the second rack are sequentially arranged along a width direction of the electronic device, and the slide rail and the first rack are disposed at a side edge portion of the main part.

6. The electronic device, according to claim 4, further comprising a connection assembly, wherein the connection assembly comprises:
   a connection portion, rotatably coupled with the gear; and
   a fixing portion, wherein one end of the fixing portion is coupled with the connection portion, and the other end of the fixing portion is coupled with the movable member.

7. The electronic device, according to claim 1, wherein the movable member is of a cylindrical shape, and a surface of the main part that faces the movable member is recessed inwardly to dispose an arc surface fitting the movable member.

8. The electronic device, according to claim 1, wherein a magnetic force between the bracket and the body causes the flexible display to switch from the retracted state to the slide-out state.

9. The electronic device, according to claim 8, wherein the bracket is provided with a first magnet, and the body is provided with a second magnet, magnetism of which is the same as that of the first magnet; when the flexible display is switched between the retracted state and the slide-out state, the first magnet and the second magnet approach each other under an external force, and are moved away from each other under a magnetic force.

10. The electronic device, according to claim 9, wherein the body further comprises a fixed surface disposed opposite to the side surface, the first magnet moves along with the bracket; and
   a value of a distance between the second magnet and the fixed surface is a first value; when the flexible display is in the retracted state, a value of a distance between the first magnet and the fixed surface is a second value; when the flexible display is in the slide-out state, a value of a distance between the first magnet and the fixed surface is a third value; a ratio of a sum of the second value and the third value to the first value is approximately 2.

11. The electronic device, according to claim 8, wherein the bracket is provided with a first magnet with changeable magnetic poles, and the body is provided with a second magnet with changeable magnetic poles; when the flexible display is switched between the retracted state and the slide-out state, the first display portion is pushed by an attractive force or a repulsive force of the first magnet and the second magnet.

12. The electronic device, according to claim 1, wherein a slide direction of the flexible display is a length direction or a width direction of the electronic device.

13. The electronic device, according to claim 1, wherein the functional component further comprises at least one of: an ambient light sensor, a distance sensor, a dot projector, and a camera.

14. The electronic device, according to claim 1, further comprising:
   a driver configured to drive the flexible display to switch between the retracted state and the slide-out state; and
   a controller electrically coupled with the driver to control the driver to move.

15. The electronic device, according to claim 1, wherein a flexible backing layer is disposed at a contact area of the first display portion and the side surface of the body.

16. The electronic device, according to claim 1, wherein the flexible display further comprises a screen shell, the screen shell is configured to support the first display portion and the second display portion, and at least a part of the screen shell disposes the bracket.

17. The electronic device, according to claim 1, wherein a magnetic force between the bracket and the body causes the flexible display to switch from the slide-out state to the retracted state.

* * * * *